United States Patent
Wu et al.

(10) Patent No.: US 12,304,355 B2
(45) Date of Patent: May 20, 2025

(54) AUGMENTED COOLING SYSTEM FOR VEHICLES POWERED BY FUEL CELLS

(71) Applicant: International Engine Intellectual Property Company, LLC, Lisle, IL (US)

(72) Inventors: Shouhao Wu, South Barrington, IL (US); Weiying Yang, Buffalo Grove, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 587 days.

(21) Appl. No.: 17/697,576

(22) Filed: Mar. 17, 2022

(65) Prior Publication Data

US 2023/0294559 A1    Sep. 21, 2023

(51) Int. Cl.
| | |
|---|---|
| *B60L 58/33* | (2019.01) |
| *B60H 1/00* | (2006.01) |
| *B60K 11/02* | (2006.01) |
| *H01M 8/04007* | (2016.01) |
| *H01M 8/04701* | (2016.01) |
| *H01M 8/04746* | (2016.01) |

(52) U.S. Cl.
CPC .......... *B60L 58/33* (2019.02); *B60H 1/00278* (2013.01); *B60H 1/00385* (2013.01); *B60K 11/02* (2013.01); *H01M 8/04074* (2013.01); *H01M 8/04701* (2013.01); *H01M 8/04768* (2013.01); *B60H 2001/00307* (2013.01)

(58) Field of Classification Search
CPC ....... B60L 58/33; B60L 1/02; B60H 1/00278; B60H 1/00385; B60H 1/00271; B60H 1/00499; B60H 2001/00307; B60K 11/02; B60K 1/00; H01M 8/04074; H01M 8/04701; H01M 8/04768; B60Y 2400/202; B60Y 2400/302; Y02E 60/50; F01P 3/12; F01P 3/20; F01P 7/14; F01P 2007/146

See application file for complete search history.

(56) References Cited

U.S. PATENT DOCUMENTS

| | | | |
|---|---|---|---|
| 4,924,838 A | | 5/1990 | McCandless |
| 6,312,842 B1 * | | 11/2001 | Reiser ............... H01M 8/04029 429/437 |
| 6,827,141 B2 | | 12/2004 | Smith et al. |
| 6,962,195 B2 | | 11/2005 | Smith et al. |
| 6,971,446 B2 | | 12/2005 | Price et al. |

(Continued)

FOREIGN PATENT DOCUMENTS

| | | |
|---|---|---|
| EP | 3088230 A1 | 11/2016 |
| EP | 3888964 A1 | 10/2021 |

OTHER PUBLICATIONS

International Search Report and Written Opinion for PCT/US2023/011525, dated May 24, 2023 (8 pages).

*Primary Examiner* — Grant Moubry
(74) *Attorney, Agent, or Firm* — Mark C. Bach; Umang Khanna

(57) ABSTRACT

A cooling system comprises a liquid storage tank and liquid disposed within the liquid storage tank. A first heat exchanger is immersed within the liquid, wherein refrigerant from an air conditioning system flows through the first heat exchanger. A second heat exchanger is also immersed within the liquid, wherein coolant from a load cooling system flows through the second heat exchanger.

19 Claims, 1 Drawing Sheet

(56) References Cited

U.S. PATENT DOCUMENTS

| | | | |
|---|---|---|---|
| 2004/0001984 A1* | 1/2004 | Alva | H01M 8/04044 |
| | | | 429/442 |
| 2006/0060340 A1* | 3/2006 | Busse | B60L 58/27 |
| | | | 165/202 |
| 2008/0250804 A1* | 10/2008 | Kubo | F17C 5/007 |
| | | | 165/44 |
| 2011/0016900 A1 | 1/2011 | Oriet et al. | |
| 2016/0107508 A1 | 4/2016 | Johnston | |

* cited by examiner

AUGMENTED COOLING SYSTEM FOR VEHICLES POWERED BY FUEL CELLS

FIELD OF THE INVENTION

The present disclosure relates generally to a cooling system for a vehicle, and more particularly to an augmented cooling system for a vehicle powered by one or more hydrogen fuel cells.

BACKGROUND

Hydrogen fuel cells are growing in popularity as the source of motive power for cars, trucks, and other vehicles. However, cooling of hydrogen fuel cells can be difficult because of the relatively low operating temperatures of the hydrogen fuel cells, in particular, because heat from hydrogen fuel cells is more difficult to reject due to a smaller temperature difference between the operating temperature of the hydrogen fuel cells and the ambient air.

A cooling system's required capability for a source of motive power, represented by the relation $Q/\Delta T$, is measured by a required rate of rejection of heat, $Q$, from the source of motive power, where the heat is rejected at a certain temperature difference, $\Delta T$, between the source of motive power and ambient air. With similar generated power levels, the required rate of heat rejection of a hydrogen fuel cell is 1.5 to 2 times that of a diesel engine, but the hydrogen fuel cell $\Delta T$ is typically less than half that of the diesel engine. This means the cooling system's required capability for hydrogen fuel cells needs to be 3 to 4 times that for diesel engines.

Because the cooling system capability of a conventional cooling system is realized by the size of the radiator(s) and the power of the fan(s) to drive the cooling air, it is very difficult, if not impossible, to re-package the radiator(s) and fan(s) for use with hydrogen fuel cells without a major vehicle redesign. A need therefore exists for an augmented cooling system for hydrogen fuel cell powered vehicles. It would be beneficial if the cooling system can operate at less than full capability for most operating conditions, but can be augmented to operate at a higher capability at higher than normal operating conditions, for example, full power and hot ambient conditions.

SUMMARY OF THE INVENTION

In one aspect of the invention, a cooling system comprises a liquid storage tank and liquid disposed within the liquid storage tank. A first heat exchanger is immersed within the liquid, wherein refrigerant from an air conditioning system flows through the first heat exchanger. A second heat exchanger is also immersed within the liquid, wherein coolant from a load cooling system flows through the second heat exchanger.

In another aspect of the invention, a cooling system comprises a liquid storage tank and liquid disposed within the liquid storage tank. A temperature sensor is disposed in thermal contact with the liquid. The cooling system further comprises a first heat exchanger immersed within the liquid, and an air conditioning system connected in fluid communication with the first heat exchanger, wherein refrigerant from the air conditioning system flows through the first heat exchanger. The cooling system further comprises a second heat exchanger immersed within the liquid, and a load cooling system for cooling a load, the load cooling system connected in fluid communication with the second heat exchanger, wherein coolant from the load cooling system flows through the second heat exchanger.

In a further aspect of the invention, a cooling system comprises a liquid storage tank and liquid disposed within the liquid storage tank. A temperature sensor is disposed in thermal contact with the liquid. The cooling system further comprises a first heat exchanger immersed within the liquid, and an air conditioning system connected in fluid communication with the first heat exchanger, wherein refrigerant from the air conditioning system flows through the first heat exchanger. The cooling system further comprises a second heat exchanger immersed within the liquid, and a hydrogen fuel cell cooling system connected in fluid communication with the second heat exchanger, wherein coolant from the hydrogen fuel cell cooling system flows through the second heat exchanger.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

Figure 1:
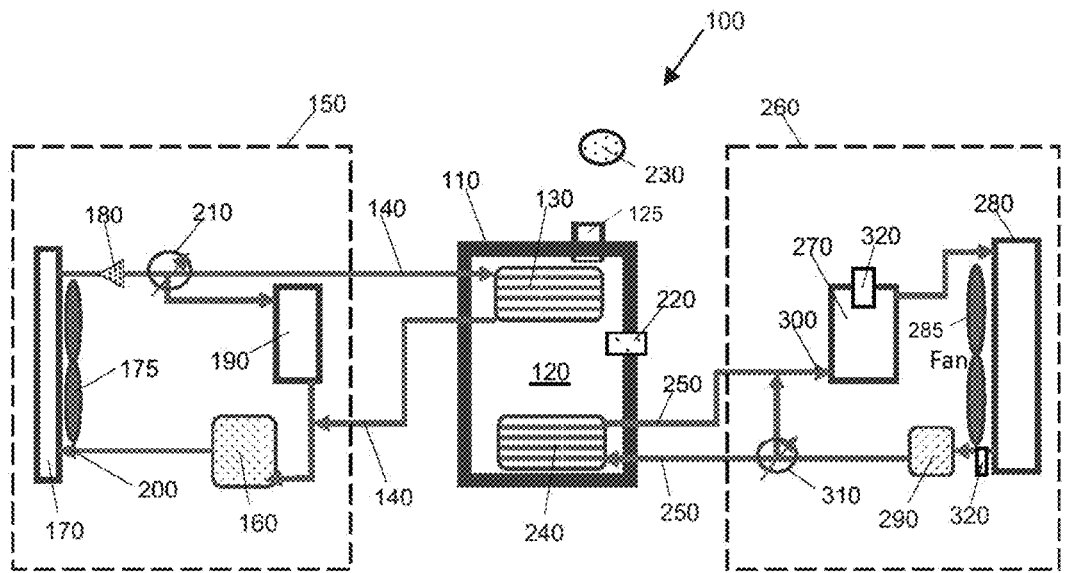
FIG. 1 is schematic diagram of a cooling system according to an embodiment of the invention.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

An exemplary cooling system 100 as described herein utilizes a well-insulated liquid storage tank 110 containing a liquid 120 within which are disposed first and second heat exchangers 130, 240, respectively. The first heat exchanger 130 maintains the liquid 120 at a first required temperature as explained hereinbelow, and the liquid 120 in turn maintains the second heat exchanger 240 at a sufficiently low temperature to provide augmented cooling as needed for a source of motive power 270, for example, one or more hydrogen fuel cells 270.

The size of the liquid storage tank 100, or volume of the liquid 120, can be determined based on the duty cycle of the vehicle on which the system is installed and the geographic location of the operating vehicle.

Referring now to FIG. 1, an exemplary embodiment of the cooling system 100 includes the liquid storage tank 110, which is well insulated from its ambient environment, as indicated by the thickened boundary line in FIG. 1. In an embodiment liquid 120 is disposed within the liquid storage tank 110. In an embodiment, the liquid 120 is a conventional type of coolant, for example without limitation, ethylene glycol or other known coolant. In an embodiment, the liquid 120 comprises a conventional type of coolant, for example without limitation, ethylene glycol or other known coolant mixed with other kinds of coolant. In other embodiments, the liquid is another sort of coolant, for example without limitation as is used in cooling systems as is known in the art, or a combination of multiple other sorts of coolants. The liquid 120 is maintained at a predetermined temperature that is much lower than the ambient environment, as will be more fully explained below.

In an embodiment a first heat exchanger 130 is immersed within the liquid 120 and connected via conduits or piping 140 as is known in the art to an air conditioning system 150 as indicated by the dashed box labeled 150 in FIG. 1. In an embodiment the air conditioning system 150 is a conventional air conditioning system, for example, that can be found in any vehicle, and includes a compressor 160, a condenser 170, an expansion valve 180, and an evaporator 190 arranged in a circuit of conduits or piping as is known in the art through which refrigerant flows in the direction of the arrows 200 as indicated on FIG. 1. In an embodiment the air conditioning system 150 further comprises a fan 175 to assist in the shedding of waste heat from the condenser 170.

In an embodiment the air conditioning system 150 further comprises a refrigerant regulating valve 210 disposed between the expansion valve 180 and the evaporator 190. The refrigerant regulating valve 210 controls the amount of refrigerant that flows from the air conditioning system 150 to the first heat exchanger 130 via the conduit 140. In an embodiment, the refrigerant from the air conditioning system 150 that flows through the refrigerant regulating valve 210 to the first heat exchanger 130 cools the liquid 120 to the predetermined temperature, which is below the ambient environmental temperature by a predetermined temperature difference.

In an embodiment a first temperature sensor 220 is disposed in or on the liquid storage tank 110 in thermal contact with the liquid 120, and a second temperature sensor 230 is disposed in thermal contact with the ambient environment. In an embodiment the first temperature sensor 220, and the second thermal sensor 230 are in electrical communication with a control system as is known in the art for the air conditioning system 150, allowing the air conditioning system 150 and the refrigerant regulating valve 210 to operate as required to cool the liquid 120 to the predetermined temperature difference. In an embodiment the predetermined temperature is about 30 degrees Fahrenheit; however, in other embodiments the predetermined temperature difference is any temperature difference between about 1 degree and about 80 degrees Fahrenheit.

Still referring to FIG. 1, in an embodiment a second heat exchanger 240 is immersed within the liquid 120 and connected via conduits or piping 250 as is known in the art to a load cooling system 260 as indicated by the dashed box labeled 260 in FIG. 1. In an embodiment, a liquid circulating pump 125 is disposed within the liquid storage tank 110 to promote circulation of the liquid 120 around the first and second heat exchangers 130, 240, to further promote thermal equalization of the liquid 120 and the first and second heat exchangers 130, 240 by convective heat transfer. In an embodiment the load cooling system 260 includes, for example without limitation, a load to be cooled 270, a radiator 280, and a coolant pump 290 arranged in a circuit of conduits or piping as is known in the art through which coolant flows in the direction of the arrows 300 as indicated on FIG. 1. In an embodiment the load cooling system 260 further comprises a fan 285 to assist in the shedding of waste heat from the radiator 280.

In an embodiment the load cooling system 260 further comprises a coolant regulating valve 310 disposed, for example without limitation between the coolant pump 290 and the load 270. The coolant regulating valve 310 controls the amount of coolant that flows from the load cooling system 260 to the second heat exchanger 240 via the conduit 250. In an embodiment, the coolant from the load cooling system 260 that flows through the coolant regulating valve 310 to the second heat exchanger 240 is cooled by the liquid 120 ideally to the temperature of the liquid 120.

In an embodiment a third temperature sensor 320 is disposed in thermal contact with the load 270, or alternatively, in thermal contact with the coolant flowing through the load cooling system 260, for example, at an outlet side of the radiator 280. In an embodiment the third temperature sensor 320 is in electrical communication with a control system as is known in the art for the load cooling system 260, allowing the for the load cooling system 260 and the coolant regulating valve 310 to operate as required to cool the load 270. In an embodiment the temperature of the load 270 or of the coolant at the outlet of the radiator 280 as measured by the third temperature sensor 320 is compared to a predetermined maximum load operating temperature. In an embodiment, if the measured temperature of the load 270 or of the coolant at the outlet of the radiator 280 is less than the predetermined maximum load operating temperature, the coolant regulating valve 310 limits or prevents flow of the coolant to the second heat exchanger 240; however, if the measured temperature of the load 270 or of the coolant at the outlet of the radiator 280 is greater than the predetermined maximum load operating temperature, the coolant regulating valve 310 allows at least a portion of the flow of the coolant to flow to the second heat exchanger 240 for additional cooling that is derived from passing through the second heat exchanger. In other embodiments, the coolant regulating valve 310 is always partly open to allow coolant to flow to the second heat exchanger 240 and the proportion of coolant diverted to the second heat exchanger 240 is adjusted as needed to maintain the temperature of the load 270 at or below the maximum load operating temperature.

In an embodiment, the load 270 comprises at least one hydrogen fuel cell 270. In an embodiment the load 270 comprises another source of motive power that requires cooling. In an embodiment, the cooling system 100 is used in a method 400 for cooling the load 270, for example without limitation a hydrogen fuel cell 270.

Figure 2:
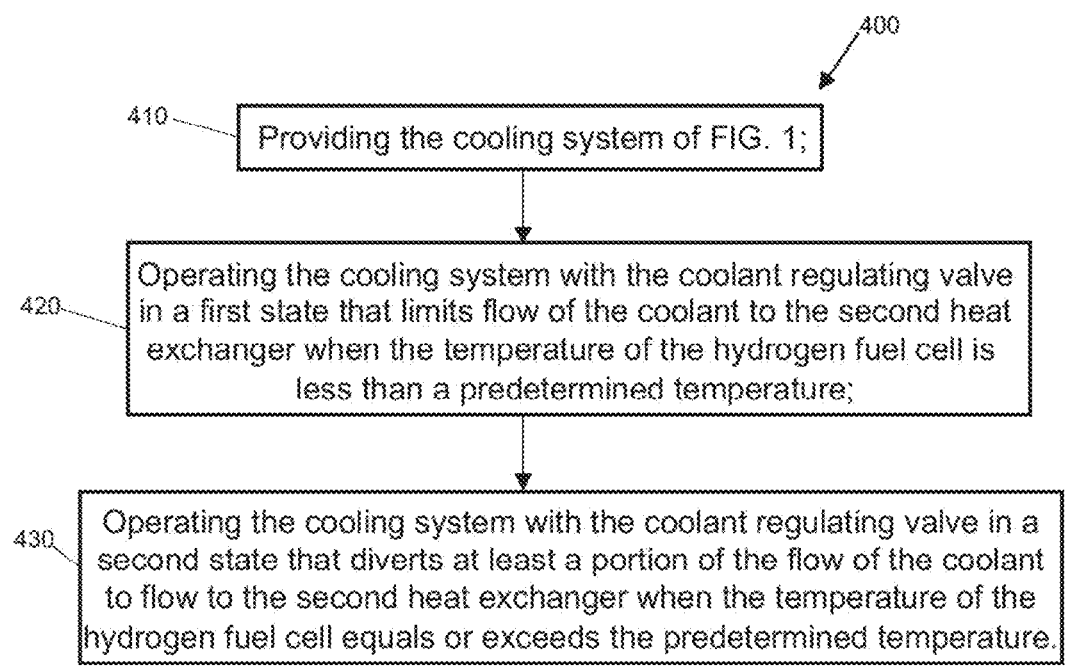
FIG. 2 is a flowchart of a method of operation of the cooling system according to an embodiment of the invention.

Referring to FIG. 2, the method 400 starts at step 410, wherein the cooling system 100 as described hereinabove in regard to FIG. 1 is provided. At step 420, the cooling system 100 is operated with the coolant regulating valve 310 in a first state that limits flow of the coolant to the second heat exchanger 240 when the temperature of the hydrogen fuel cell 270 (or the temperature of the coolant at the outlet of the radiator 280) is less than a predetermined temperature. At step 430, the cooling system 100 is operated with the coolant regulating valve 310 in a second state that diverts at least a portion of the flow of the coolant to flow to the second heat exchanger 240 when the temperature of the hydrogen fuel cell 270 (or the temperature of the coolant at the outlet of the radiator 280) equals or exceeds the predetermined temperature.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity. Unless otherwise noted, the use of the words "approximate," "about," "around," "substantially," etc., mean plus or minus ten percent.

INDUSTRIAL APPLICABILITY

A cooling system 100 as described hereinabove provides for augmented cooling for a vehicle powered by an alternative source of motive power such as, for example, one or more hydrogen fuel cells 270 without requiring a major redesign of the vehicle to accommodate the cooling system 100. The cooling system 100 can be manufactured in industry for use in vehicles powered by hydrogen fuel cells.

Numerous modifications to the present invention will be apparent to those skilled in the art in view of the foregoing description. It is not desired to limit the invention to the exact construction and operation shown and described, and accordingly, all suitable modifications and equivalents may be resorted to, falling within the scope of the invention. Accordingly, this description is to be construed as illustrative only of the principles of the invention and is presented for the purpose of enabling those skilled in the art to make and use the invention and to teach the best mode of carrying out same. The exclusive rights to all modifications which come within the scope of the appended claims are reserved. All patents, patent publications and applications, and other references cited herein are incorporated by reference herein in their entirety.

We claim:

1. A cooling system, comprising:
   a liquid storage tank;
   liquid disposed within the liquid storage tank;
   a first heat exchanger immersed within the liquid, wherein refrigerant from an air conditioning system flows through the first heat exchanger;
   a second heat exchanger immersed within the liquid, wherein coolant from a load cooling system flows through the second heat exchanger.

2. The cooling system of claim 1, further comprising a temperature sensor disposed in thermal contact with the liquid.

3. The cooling system of claim 2, further comprising the air conditioning system connected in fluid communication with the first heat exchanger, wherein the air conditioning system further comprises a refrigerant regulating valve that controls an amount of flow of the refrigerant to the first heat exchanger.

4. The cooling system of claim 3, wherein the liquid is cooled to a temperature below the ambient environmental temperature by the refrigerant flowing through the refrigerant regulating valve to the first heat exchanger, wherein the temperature is less than the ambient environmental temperature by a predetermined temperature difference.

5. The cooling system of claim 2, further comprising the load cooling system for cooling a load, wherein the load cooling system is connected in fluid communication with the second heat exchanger and further comprises a coolant regulating valve that controls an amount of flow of the coolant to the second heat exchanger.

6. The cooling system of claim 5, wherein the coolant regulating valve prevents flow of the coolant to the second heat exchanger until the temperature of the load exceeds a predetermined temperature.

7. The cooling system of claim 6, wherein the load comprises at least one hydrogen fuel cell.

8. The cooling system of claim 1, wherein the liquid comprises ethylene glycol.

9. A cooling system, comprising:
   a liquid storage tank;
   liquid disposed within the liquid storage tank;
   a temperature sensor disposed in thermal contact with the liquid;
   a first heat exchanger immersed within the liquid;
   an air conditioning system connected in fluid communication with the first heat exchanger, wherein refrigerant from the air conditioning system flows through the first heat exchanger;
   a second heat exchanger immersed within the liquid; and
   a load cooling system for cooling a load, the load cooling system connected in fluid communication with the second heat exchanger, wherein coolant from the load cooling system flows through the second heat exchanger.

10. The cooling system of claim 9, wherein the air conditioning system further comprises a refrigerant regulating valve that controls an amount of flow of the refrigerant to the first heat exchanger, and wherein the load cooling system further comprises a coolant regulating valve that controls an amount of flow of the coolant to the second heat exchanger.

11. The cooling system of claim 10, wherein the liquid is cooled to a temperature below the ambient environmental temperature by the refrigerant flowing through the refrigerant regulating valve to the first heat exchanger, wherein the temperature is less than the ambient environmental temperature by a predetermined temperature difference.

12. The cooling system of claim 10, wherein the coolant regulating valve prevents flow of the coolant to the second heat exchanger until the temperature of the load exceeds a predetermined temperature.

13. The cooling system of claim 12, wherein the load comprises at least one hydrogen fuel cell.

14. The cooling system of claim 9, wherein the liquid comprises ethylene glycol.

15. A cooling system, comprising:
    a liquid storage tank;
    liquid disposed within the liquid storage tank;
    a temperature sensor disposed in thermal contact with the liquid;
    a first heat exchanger immersed within the liquid;
    an air conditioning system connected in fluid communication with the first heat exchanger, wherein refrigerant from the air conditioning system flows through the first heat exchanger;
    a second heat exchanger immersed within the liquid; and
    a hydrogen fuel cell cooling system connected in fluid communication with the second heat exchanger, wherein coolant from the hydrogen fuel cell cooling system flows through the second heat exchanger.

16. The cooling system of claim 15, wherein the air conditioning system further comprises a refrigerant regulating valve that controls an amount of flow of the refrigerant to the first heat exchanger, and wherein the hydrogen fuel cell cooling system further comprises a coolant regulating valve that controls an amount of flow of the coolant to the second heat exchanger.

17. The cooling system of claim 16, wherein the liquid is cooled to a temperature below the ambient environmental temperature by the refrigerant flowing through the refrigerant regulating valve to the first heat exchanger, wherein the temperature is less than the ambient environmental temperature by a predetermined temperature difference.

18. The cooling system of claim 15, wherein the liquid comprises ethylene glycol.

19. A method for cooling a hydrogen fuel cell, the method comprising the steps of: providing the cooling system of claim 17;
    operating the cooling system with the coolant regulating valve in a first state that prevents flow of the coolant to the second heat exchanger when the temperature of the hydrogen fuel cell is less than a predetermined temperature; and operating the cooling system with the coolant regulating valve in a second state that diverts at least a portion of the flow of the coolant to the second heat exchanger when the temperature of the hydrogen fuel cell equals or exceeds the predetermined temperature.

* * * * *